United States Patent [19]

Jin

[11] Patent Number: 5,703,141
[45] Date of Patent: Dec. 30, 1997

[54] UV CURABLE COATINGS

[75] Inventor: Peiwen Jin, Washingtonville, N.Y.

[73] Assignee: Tarkett AG, Frankenthal, Germany

[21] Appl. No.: 533,538

[22] Filed: Sep. 25, 1995

[51] Int. Cl.$^6$ ........................................... C08F 2/46
[52] U.S. Cl. ........................ 522/97; 528/75; 525/162
[58] Field of Search ..................... 522/97; 528/75; 525/162

[56] References Cited

U.S. PATENT DOCUMENTS

| | | | |
|---|---|---|---|
| 4,188,472 | 2/1980 | Chang | 528/75 |
| 4,340,497 | 7/1982 | Knopf | 252/188.3 R |
| 4,778,831 | 10/1988 | Kemper | 522/18 |
| 4,847,329 | 7/1989 | Koleske et al. | 525/162 |
| 4,874,799 | 10/1989 | Hung et al. | 522/97 |
| 5,115,025 | 5/1992 | Koleske et al. | 525/162 |
| 5,179,183 | 1/1993 | Koleske et al. | 525/162 |

*Primary Examiner*—Mark Chapman
*Attorney, Agent, or Firm*—Nies, Kurz, Bergert & Tamburro

[57] ABSTRACT

The present invention relates to oligomers or prepolymers which are formed by reacting an isocyanate, a lactone adduct and a hydroxyalkyl acrylate or methacrylate. These oligomers can be used to make UV curable coatings by adding acrylate monomers, photoinitiators and wetting agents. Transparent, abrasion resistant surfaces result from the cure by ultraviolet light of these coatings on substrates such as PVC based substrates. By adjusting the ratio of hydroxyalkyl acrylate or methacrylate and the lactone adduct component in the oligomer, coatings with both high tensile strength and elongation can be obtained.

30 Claims, No Drawings

UV CURABLE COATINGS

BACKGROUND AND SUMMARY OF THE INVENTION

The present invention relates to UV curable coatings prepared from low viscosity oligomers. The present invention is concerned with coating compositions wherein a low viscosity, high content of oligomer can be used for the coatings to obtain high mechanical properties. Adjustment of the ratio of the end capping agents in the oligomer allows the preparation of coatings with various properties, from very hard to very soft, which may be used for different purposes. By the present invention, coatings are prepared having high tensile strength or hardness as well as high elongation. The coating compositions of the present invention have been found to have a low viscosity and to be readily cured by UV curing methods.

Previous lactone-containing coating compositions are described, for example, in the following U.S. Pat. Nos. 4,188,472 to Chang; 4,340,497 to Knopf; 4,847,329 to Koleske et al.; and 5,115,025 to Koleske et al.

In one embodiment, the present invention relates to oligomers or prepolymers prepared by reacting a lactone adduct and an isocyanate in a first reaction, after which the product of the first reaction is reacted with a hydroxyalkyl acrylate or methacrylate and an additional lactone adduct component. These oligomers may be used to make UV curable coatings by adding acrylate monomers, photoinitiators and wetting agents. Transparent, abrasion resistant surfaces result from the cure by ultraviolet light of these coatings on PVC based substrates.

In order to compare various reactions related to the invention, in one reaction isophorone diisocyanate, caprolactone acrylate (SR 495, a particular adduct described hereinafter), and a stabilizer such as 4-methoxyphenol were mixed at room temperature. The mixture was heated to 75° C. with stirring to yield an oligomer. In another reaction, isophorone diisocyanate, caprolactone acrylate, a stabilizer such as 4-methoxyphenol and a catalyst such as dibutyltin dilaurate were mixed at room temperature. The mixture was heated to 75° C. with stirring, after which hydroxyethyl acrylate was added under controlled temperature conditions and an acrylate monomer such as propoxylated neopentyl glycol diacrylate was then mixed into the oligomer along with a photoinitiator and optional components such as a wetting agent to obtain a coating.

As an example of specific reactants employed in carrying out the invention, isophorone diisocyanate, caprolactone acrylate, a stabilizer such as 4-methoxyphenol and a catalyst such as dibutyltin dilaurate were mixed at room temperature followed by controlled heating. Hydroxyethyl acrylate and additional caprolactone acrylate were then added under controlled temperature conditions. An acrylate monomer in the form of propoxylated neopentyl glycol diacrylate was then added along with a photoinitiator and optional components such as a wetting agent to afford the desired coating.

In another embodiment of the invention, a polyisocyanate in the form of a triisocyanate was initially reacted with caprolactone acrylate and hydroxyethyl acrylate.

In these embodiments, dry air was employed during the reactions to avoid polymerization.

DESCRIPTION OF THE PREFERRED EMBODIMENTS

The lactone component employed in the present invention can be any of various lactone adducts of an epsilon-caprolactone and a hydroxyalkyl acrylate or methacrylate. The caprolactone may be epsilon-caprolactone or one of the substituted epsilon-caprolactones in the form of alkyl substituted epsilon-caprolactones wherein the alkyl groups are of 1 to 4 carbon atoms. Examples of these caprolactones include epsilon-methyl caprolactone, epsilon-ethyl caprolactone, and epsilon-propyl caprolactone. If the alkyl chain is too long, the oligomer will become too soft. Such lactone adducts are known to those skilled in the art and it will be appreciated that mixtures can be used. The preferred lactone adduct is caprolactone acrylate, identified herein as SR495, which is classified as a low skin irritation monomer with low volatility, and is a monofunctional acrylate with a free hydroxy end group. The urethane oligomers made from SR495 and hydroxyethyl acrylate (HEA) were found to have very low viscosity. Thus a high percentage of the oligomer can be used in the coating formulation to improve the mechanical properties. By adjusting the ratio of HEA and SR495 in the oligomer, coatings with various properties, including both high tensile and elongation, can be obtained.

The isocyanate component can be any of various di- and poly (including tri-) isocyanates and many such compounds are known and are commercially available. Examples of isocyanates which can be employed include the following: isophorone diisocyanate; bis (4-isocyanatocyclohexyl) methane; diphenylmethane 4,4'-diisocyanate; toluene diisocyanate; 1,3-bis (1-isocyanato-1-methylethyl) benzene; hexamethylene diisocyanate; biuret of hexamethylene diisocyanate, triisocyanate; and isocyanurate of hexamethylene diisocyanate, triisocyanate.

As examples of hydroxyalkyl acrylates or methacrylates which may be employed, there should be mentioned compounds with a short alkyl chain having 1 to 4 carbon atoms, including hydroxyethyl acrylate, hydroxypropyl acrylate and hydroxybutyl acrylate, hydroxyethyl methacrylate, hydroxypropyl methacrylate and hydroxybutyl methacrylate.

EXAMPLES

The following examples illustrate, but in no way limit, the present invention. All percentages are by weight.

GLOSSARY OF MATERIALS USED IN EXAMPLES

1. SR495—Caprolactone acrylate from Sartomer, an adduct of epsilon-caprolactone and hydroxyethyl acrylate having the following structural formula:

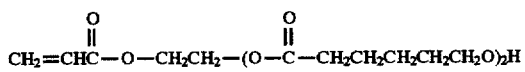

2. SR9003—Propoxylated neopentyl glycol diacrylate
3. IPDI—Isophorone diisocyanate
4. HEA—Hydroxyethyl acrylate
5. SR399—Dipentaerythritol Pentaacrylate
6. SR368—Tris (2-hydroxyl ethyl) isocyanurate Triacrylate
7. Darocur 1173 and Irgacure 184 (I-184)—Photoinitiators from Ciba-Geigy
8. UO93—a commercial coating from Lord Corp. used as the control
9. PEG 200DA—Polyethylene glycol diacrylate
10. TPGDA—Tripropylene glycol diacrylate
11. TMPTA—Trimethylol propane triacrylate 12. GPTA—Glycerol propoxylated triacrylate
13. HDDA—Hexanediol diacrylate
14. T-12—Dibutyltin dilaurate
15. HDI—Hexamethylene diisocyanate
16. Desmodur N-3200—Polymeric hexamethylene diisocyanate (1,6-Hexamethylene diisocyanate based polyisocyanate) from Miles, Inc., also referred to as the biuret of HDI, triisocyanate and having the following structural formula:

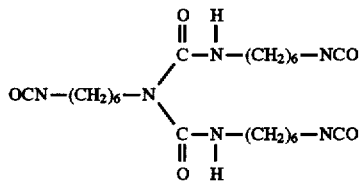

17. Tinuvin 123—Hindered aminoether light stabilizer from Ciba-Geigy
18. UV - OB—Fluorescent whitening agent from Ciba-Geigy
19. TK66—a commercial coating from Fergusson Inc.

The SR495 component is a monofunctional monomer in the form of a monofunctional (meth)acrylic ester which is a non-crosslinkable, low viscosity monomer employed as an end capping agent in the production of the oligomer. SR495 has a free OH group and can react easily with isocyanate.

The SR9003 component is a difunctional monomer in the form of a difunctional (meth)acrylic ester which provides a good balance of low viscosity, fast reactivity and crosslink density properties to radiation and peroxide cure systems.

Examples 1 through 3 relate to preparation of various oligomers which were employed while carrying out the present invention.

EXAMPLE 1

TK57B (SR495-IPDI-SR495)

IPDI (222 g, 1 mole), SR495 (756.8 g, 2.2 mole), T-12 (0.8 g) and 4-Methoxyphenol (0.5 g) were mixed at room temperature. The mixture was heated to 75° C. and stirred for 2 hours to afford oligomer TK57. Check IR, if necessary, add methanol (or other chemicals) to eliminate the residue of IPDI. Viscosity of Oligomer: 4,500 cps/RT.

EXAMPLE 2

TK58 (HEA-IPDI-SR495)

IPDI (222 g, 1 mole), SR495 (378.4 g, 1.1 mole), T-12 (0.8 g) and 4-Methoxyphenol (0.5 g) were mixed at room temperature. The mixture was heated to 75° C. and stirred for 0.5 hour. HEA (127.6 g, 1.1 mole) was then added slowly (keep temperature below 85° C.). After adding HEA, the mixture was heated to 75° C. and stirred for another 1.5 hour. Check IR, if necessary, add methanol (or other chemicals) to eliminate the residue of IPDI. Viscosity of oligomer: 9,700 cps/RT.

SR9003 (111 g, 13%), I-184 (16.2 g, 1.9%), Tinuvin 123 (0.86 g, 0.1%) and UV-OB (150 ppm) were mixed into the oligomer (50° C. for 15 min.) to afford coating TK58. Viscosity of coating: 3,000 cps/RT.

EXAMPLE 3

TK88-2A (HEA, SR495-IPDI-SR495)

IPDI (222 g, 1 mole), SR495 (550 g, 1.6 mole), T-12 (0.8 g) and 4-Methoxyphenol (0.5 g) were mixed at room temperature. The mixture was heated to 75° C. and stirred for 0.5 hour. HEA (51 g, 0.44 mole) and SR495 (55 g, 0.16 mole) were then added slowly (keep temperature below 85° C.). After adding HEA, the mixture was heated to 75° C. and stirred for another 1.5 hour. Check IR, if necessary, add methanol (or other chemicals) to eliminate the residue of IPDI. Viscosity of oligomer: 6,000 cps/RT.

SR9003 (82.0 g, 8.4%), I-184 (14.6 g, 1.5%), Tinuvin 123 (0.98 g, 0.1%) and UV-OB (150 ppm) were mixed into the oligomer (50° C. for 15 min.) to afford coating TK88-2A. Viscosity of coating: 3,200 cps/RT.

NOTE: Dry air is needed during the reaction to avoid polymerization.

In accordance with the present invention, a high percentage of low viscosity oligomer (85–95%) can be used in top and base coatings, which means high mechanical properties can be obtained from the coatings. In addition, formulations are simple. By adjusting the HEA content in the oligomer, coatings with various properties can be made. Coatings with HEA-modified oligomer gave both high tensile and elongation, which cannot be obtained by using regular multifunctional monomers. Furthermore, compared to use of HEA, manufacture is easy, and the reactions are mild and easy to control. Less chemicals are needed to make the coatings. An additional feature is the low toxicity. SR495 and SR9003 are classified as low skin irritation monomers by Sartomer. HEA, which is a commonly used end-capping agent for making urethane oligomer, has a high toxicity. In the present invention, SR495 is used to replace HEA, partially or totally, thus reducing the toxicity.

The following low viscosity oligomers were prepared based on procedures described in Examples 1 through 3, with such oligomers being identified in Table 1 and having properties as shown in Table 2.

TABLE 1

Low Viscosity Oligomers

| Oligomer | Oligomer Structure | HEA % | Viscosity (cps/77° F.) |
|---|---|---|---|
| A | SR495-IPDI-SR495 | 0 | 4,500 |
| B | HEA, SR495-IPDI-SR495 | 7 | 6,000 |
| C | HEA-IPDI-SR495 | 17 | 9,700 |
| D | HEA-IPDI-HEA | 51 | 8,500[1] |

NOTE:
[1] Mixed with 20% Hexanediol diacrylate

TABLE 2

Properties

| Oligomer | % Gloss Retention | | Tensile (psi) | Elongation (%) |
| | 150 cyc | 300 cyc | | |
|---|---|---|---|---|
| A | 96 | 73 | 1,160 | 50 |
| B | 90 | 56 | 1,520 | 47 |
| C | 70 | 30 | 2,740 | 10 |
| D | 37 | 25 | brittle | |

NOTE:
1. Oligomers were cured by UV light using Irgacure 184 from Ciba-Geigy.
2. Gloss Retention Test: GAF Floor Tile Test Method #86.

In the determination of the diluent for the coatings, the following monomers were considered:

TABLE 3

Monomer Selection

| Monomer | Surface Tension (dyne/cm) | Tensile (psi) | Elongation (%) | Shrinkage (%) |
|---|---|---|---|---|
| PEG 200DA | 40.3 | 1,880 | 3.8 | 19.7 |
| TPGDA | 32.4 | 2,950 | 10.8 | 11.9 |
| SR9003 | 31.9 | 4,380 | 19.8 | 6.8 |
| TMPTA | 35.3 | 4,500 | 2.0 | 26.0 |
| GPTA | 36.2 | 3,400 | 9.5 | 15.4 |
| HDDA | 34.8 | | | |

NOTE:
1. The data were published by P.K.T. Oldring, "Chemistry & Technology of UV & EB Formulations for Coatings, Inks & Paints", Volume II, 1991, pp. 300–303.

It was found that SR9003 has low surface tension, high tensile, high elongation and low shrinkage. Thus it is suitable to be used as the diluent for the coatings of the present invention.

In an attempt to obtain a coating with high tensile, high elongation and high gloss retention, two approaches were used: (1) TK-57-5, 57-6 with multifunctional acrylates; and (2) TK-88-2A, 2B, 3 modified by using HEA in oligomer structure. Table 4 shows some of the formulations which were employed. The properties of these formulations are shown in Table 5.

TABLE 4

Coating Formulation

| | TK57-5 | TK57-6 | TK88-2A | TK88-2B | TK88-3 |
|---|---|---|---|---|---|
| Oligomer Type | A | A | B | B | B |
| Oligomer % | 80 | 80 | 90 | 87.5 | 87.5 |
| % of HEA in the total oligomer | | | 6.0 | 6.0 | 4.8 |
| SR9003, % | 8.5 | 8.5 | 8.5 | 11 | 11 |
| SR399, % | 10 | | | | |
| SR368, % | | 10 | | | |
| Darocur 1173 Irgacure 184, % | 1.5 | 1.5 | 1.5 | 1.5 | 1.5 |
| Viscosity (cps) | 2,400 | 2,500 | 3,200 | 2,650 | 2,500 |

TABLE 5

Coating Properties

| | UO93 | TK57-5 | TK57-6 | TK88-2A | TK88-2B | TK88-3 |
|---|---|---|---|---|---|---|
| Viscosity (cps) | 3,000 | 2,400 | 2,500 | 3,200 | 2,650 | 2,500 |
| % Gloss Retention | | | | | | |
| 150 cyc | 65 | 76 | 76 | 81 | 80 | 90 |
| 300 cyc | 30 | 38 | 38 | 48 | 37 | 40 |
| Stain | | | | | | |
| KiWi | 10 | 6 | 6 | 8 | 8 | 8 |
| Iodine | 8 | 4 | 4 | 8 | 8 | 8 |
| Yellow Oil | 8 | 4 | 4 | 6 | 6 | 6 |
| Tensile (psi) | 1,400 | 1,680 | 1,650 | 1,760 | 1,940 | 1,550 |
| Elongation (%) | 30 | 17 | 21 | 45 | 40 | 37 |

NOTE:
[1]Stain test: Tarkett Chemical Resistance Method #41, Ratings from 0 to 10 (10 is very severe).

In accordance with the data shown in Table 5, it was determined that the coatings modified by HEA (TK88-2A, 2B, 3) gave high tensile, high elongation and also high gloss retention. However, coatings prepared with multifunctional acrylates (TK57-5,-6) gave high tensile but low elongation. Compared with UO93 (control), all the coatings had better stain resistance.

In order to determine the optimal ratio of HEA in the oligomer and also a suitable diluent content for the top coating, a two factor, two level experiment was carried out.

TABLE 6

| | High | Low |
|---|---|---|
| A = HEA % | 7.9 | 4.8 |
| B = SR9003 % | 12.5 | 7.5 |

TABLE 7

| Run | Gloss % (150 cyc) | Gloss % (300 cyc) | Viscosity (cps/RT) | Tensile (psi) | Elongation (%) |
|---|---|---|---|---|---|
| D1 | 82 | 46 | | | |
| | 82 | 50 | | | |
| | 78 | 44 | | | |
| Average | 81 | 47 | 3,050 | 1,500 | 42 |
| D2 | 81 | 41 | | | |
| | 84 | 50 | | | |
| | 82 | 46 | | | |
| Average | 82 | 46 | 1,970 | 1,600 | 40 |
| D3 | 85 | 48 | | | |
| | 83 | 47 | | | |
| | 76 | 43 | | | |
| Average | 81 | 46 | 3,280 | 2,000 | 38 |
| D4 | 80 | 42 | | | |
| | 77 | 38 | | | |
| | 80 | 38 | | | |
| Average | 79 | 39 | 2,300 | 2,100 | 36 |

Based upon the experimental data obtained from Tables 6 and 7, further data was generated for coatings having the compositions as shown in Table 8.

TABLE 8

| % HEA in the total oligomer | SR9003 (%) | Gloss % (300 cyc) | Viscosity (cps) | Tensile (psi) | Elongation (%) |
|---|---|---|---|---|---|
| 7.9 | 7.5 | 46.0 | 3,280 | 2,000 | 38 |
| 6.0 | 7.5 | 46.4 | 3,145 | 1,750 | 40 |
| 4.8 | 7.5 | 46.7 | 3,050 | 1,500 | 42 |
| 7.9 | 10.0 | 42.7 | 2,790 | 2,050 | 37 |
| 6.0 | 10.0 | 44.7 | 2,625 | 1,775 | 39 |
| 4.8 | 10.0 | 46.2 | 2,510 | 1,550 | 41 |
| 7.9 | 12.5 | 39.3 | 2,300 | 2,100 | 36 |
| 6.0 | 12.5 | 43.1 | 2,100 | 1,800 | 38 |
| 4.8 | 12.5 | 45.7 | 1,970 | 1,600 | 40 |

From a review of Table 8, the following conclusions were reached:

1. Within the testing range, gloss retention is not affected significantly by HEA and SR9003%.
2. Viscosity is controlled mainly by the amount of SR9003. The suitable range is about 7.5%.
3. Tensile is related to the amount of HEA. To get high tensile, the ratio of HEA to total oligomer should not be less than 0.4.
4. Elongation is slightly affected by SR9003%.

It was also found that HEA modified oligomer (TK58) improved the tensile of the regular coatings (UO93, TK66), but did not reduce the elongation.

TK58: HEA- IPDI - SR495

UO93B: UO93/TK58 (2:1)
TK66B: TK66/TK58 (2:1)

TABLE 9

| Coating Modification | | | | |
|---|---|---|---|---|
| | UO93 | UO93B | TK66 | TK66B |
| Viscosity (cps/RT) | 3,000 | 3,000 | 3,000 | 3,000 |
| % Gloss Retention | | | | |
| 150 cyc | 70 | 70 | 80 | 76 |
| 300 cyc | 30 | 30 | 40 | 38 |
| Stain | | | | |
| KiWi | 10 | 6 | 10 | 6 |
| Iodine | 8 | 8 | 8 | 8 |
| Yellow Oil | 8 | 4 | 8 | 4 |
| Tensile (psi) | 1,400 | 1,800 | 1,550 | 1,850 |
| Elongation (%) | 30 | 30 | 38 | 35 |

For the tile application, a base coating with low viscosity should be applied before the top coating to get a smooth surface. Base coatings from low viscosity oligomer (TK57) contained a high amount of oligomer, and gave high mechanical properties.

Oligomer (TK57): SR495 - IPDI - SR495

TABLE 10

| Base Coatings | | | |
|---|---|---|---|
| | TK57 | TK57B | TK57B-1 |
| Oligomer (%) | 98 | 85 | 85 |
| HDDA (%) | | 13 | 8 |
| Isodecyl acrylate (%) | | | 5 |
| Darocur 1173 (%) | 2 | 2 | 2 |
| Viscosity (cps) | 4,500 | 1,000 | 1,000 |
| Compatible with Top Coatings | yes | yes | yes |
| Adhesion to Tile | | good | good |
| % Gloss Retention | | | |
| 150 cyc | 96 | 78 | 83 |
| 300 cyc | 73 | 40 | 47 |
| Stain | same as Control | same as Control | same as Control |
| Tensile (psi) | 1,160 | 1,560 | 1,250 |
| Elongation (%) | 50 | 21 | 32 |

The following examples illustrate the use of polyisocyanate (Desmodur N-3200), along with SR 495 and HEA. Other polyisocyanates such as Desmodur N-3300 (isocyanurate of HDI, triisocyanate) may also be employed.

EXAMPLE 4 (TK90)

N-3200 (181 g), SR495 (344 g), T-12 (0.5 g) and 4-Methoxyphenol (0.25 g) were mixed at room temperature. The mixture was heated to 75° C. and stirred for 1 hour to afford the oligomer. There was no residue of isocyanate found in IR.

SR9003 (143.2 g, 21%) and I-184 (13.6 g, 2%) were mixed into the oligomer (50° C. for 15 minutes) to afford coating TK90. Viscosity of coating: 4,500 cps/RT.

EXAMPLE 5 (TK91)

N-3200 (181 g), SR495 (229.3 g), HEA (38.6 g), T-12 (0.5 g) and 4-Methoxyphenol (0.25 g) were mixed at room temperature. The mixture was heated to 75° C. and stirred for 1 hour to afford the oligomer. There was no residue of isocyanate found in IR.

SR9003 (137.6 g, 23%) and I-184 (12 g, 2%) were mixed into the oligomer (50° C. for 15 minutes) to afford coating TK91. Viscosity of coating: 5,000 cps/RT.

EXAMPLE 6 (TK92)

N-3200 (181 g), SR495 (114.7 g), HEA (77.3 g), T-12 (0.5 g) and 4-Methoxyphenol (0.25 g) were mixed at room temperature. The mixture was heated to 75° C. and stirred for 1 hour to afford the oligomer. There was no residue of isocyanate found in IR.

SR9003 (149.2 g, 28%) and I-184 (10.7 g, 2%) were mixed into the oligomer (50° C. for 15 minutes) to afford coating TK92. Viscosity of coating: 4,500 cps/RT.

TABLE 11

| Coatings Using Polyisocyanate | | | | |
|---|---|---|---|---|
| | UO93 Control | TK90 | TK91 | TK92 |
| Viscosity (cps) | 3,000 | 4,500 | 5,000 | 4,500 |
| % Gloss Retention | | | | |
| 150 cyc | 70 | 93 | 89 | 80 |
| 300 cyc | 30 | 70 | 56 | 47 |
| Stain | | | | |
| KiWi | 10 | 6 | 6 | 2 |
| Iodine | 8 | 8 | 8 | 6 |
| Yellow Oil | 8 | 6 | 4 | 1 |
| Tensile (psi) | 1,400 | 1,200 | 1,900 | 2,600 |
| Elongation (%) | 30 | 37 | 28 | 5 |

The procedures for Stain and Gloss Retention are as follows:

Stain Resistance

Stain resistance was evaluated for lipstick, 2% iodine and yellow stain oil. Three or four drops, or equivalent for solids, were applied to the surface and spread lightly over an area about one half inch square. Then the material was allowed to stand for one half hour. Then it was wiped clean with a dry cloth followed by wiping with a wet cloth using moderate pressure. The test area was observed for stain residue after wiping with the damp cloth and rated from 0=no staining to 10=very severe staining. Tests were made on smooth areas free of blemishes such as blisters, pin holes and scratches.

Gloss Retention Test

EQUIPMENT

1. Gardner straight line washability machine with nylon brush.
2. 60 degree Gardner Glossmeter (small). (Aperture: 2¼"×1" or less)
3. 10% Comet or Ajax cleanser slurry in water.
4. Straight medicine droppers (3" long×¼" diameter. Fisher Cat. #13-700 or equivalent).

Wait at least 16 hours after material has been made before running test.

PROCEDURE: This test is run in triplicate.

1. Clean brush thoroughly and immerse in water at room temperature for ½ hour prior to test.
2. Clean trough and tile wedges. Remove excess water (no need to dry).

NOTE: Clean brush, trough and wedges after each sample.

3. Cut a sample 5" long by about 4" wide.
4. Take three (3) gloss readings of the sample in the area where the brush will be traveling. Average the readings.
5. Place the sample in the trough so that it does not move: use tile samples as wedges and hold in place with clamp. Brush should be off the sample.

6. Stir the cleanser slurry thoroughly. Fill the medicine dropper half full (one squeeze of the rubber tip) and carefully squeeze slurry on the side of the sample that will first be touched by the brush when the machine is started. The slurry should be in the path of the brush.

7. Start machine. (See guide below for total cycles to be run).

8. Stop machine after each 50 cycles so that brush is off the sample, and repeat step 6.

9. Stop machine after completion of specified total cycles, remove sample and wash.

NOTE: Do not use abrasive for washing. Merely rinse, using fingers to remove cleanser.

10. Measure gloss in the dullest areas of the brush path.

11. Average three (3) readings of the sample.

12. After running the three (3) samples, average the readings and calculate percent gloss retention as follows:

Gn/Go×100=% Gloss Retention where Gn is gloss after n cycles

Go is original gloss

13. Report the average of the three (3) samples and indicate the number of cycles run.

Accuracy of this test (95% confidence)
Original Gloss +/− 3
% Gloss Retention +/− 3

The following is a guide as to number of cycles necessary to reach 50% gloss retention:

| Waxes | 10–20 Cycles |
| U.V. Curables | 150–250 Cycles |
| Heat/or Moisture cure Polyurethanes | 1000–1500 Cycles |

The Taber abrasion tests were conducted following ASTM standard test method D 4060-84 for abrasion resistance of organic coatings.

Suitable UV sources for curing the above described coating compositions include low pressure mercury vapor lamps, medium pressure mercury arc lamps, high pressure compact arc and capillary lamps, electrodeless mercury and argon lamps (from Fusion System Corp.), xenon lamps and metal halide lamps. The time of exposure to the ultraviolet light and the intensity of the ultraviolet light can be varied in accordance with known procedures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A UV curable composition having a low viscosity and useful in the preparation of coatings having high tensile strength, high elongation and high gloss retention, prepared by reacting a caprolactone adduct and an isocyanate in a first reaction, wherein the product of said first reaction is further reacted with a hydroxyalkyl acrylate or methacrylate and an additional caprolactone adduct component, while the ratio of said acrylate or methacrylate to caprolactone adduct is adjusted in order to vary the hardness and flexibility of the composition as desired.

2. The composition of claim 1 wherein said hydroxyalkyl acrylate is hydroxyethyl acrylate.

3. The composition of claim 1 wherein said caprolactone adduct is caprolactone acrylate.

4. The composition of claim 1 wherein said isocyanate is a diisocyanate.

5. The composition of claim 4 wherein said diisocyanate is isophorone diisocyanate.

6. The composition of claim 1 wherein the caprolactone adduct and the hydroxyalkyl acrylate or methacrylate are employed as end capping agents for an oligomer.

7. The composition of claim 1 wherein said isocyanate is in polymeric form.

8. The composition of claim 7 wherein said caprolactone adduct is caprolactone acrylate.

9. The composition of claim 7 wherein the caprolactone adduct and the hydroxyalkyl acrylate or methacrylate are employed as end capping agents for an oligomer.

10. The composition of claim 7 wherein said isocyanate is a triisocyanate.

11. The composition of claim 10 wherein said triisocyanate is polymeric hexamethylene diisocyanate.

12. The composition of claim 7 wherein said hydroxyalkyl acrylate is hydroxyethyl acrylate.

13. The composition of claim 1 wherein the viscosity of the composition obtained is in the range of 6,000 to 9,700 cps/77° F.

14. The composition of claim 1 prepared by partially reacting a caprolactone adduct and an isocyanate in the first reaction, with the isocyanate being in excess of the caprolactone adduct on an equivalent basis.

15. The composition of claim 1 wherein the caprolactone adduct has the following structural formula:

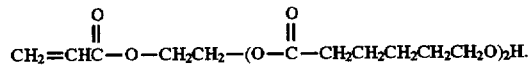

16. A method of making a UV curable composition having a low viscosity and useful in the preparation of coatings having high tensile strength, high elongation and high gloss retention, which comprises:

(a) reacting a caprolactone adduct with an isocyanate; and (b) reacting the product of step (a) with a hydroxyalkyl acrylate or methacrylate and an additional caprolactone adduct component, while adjusting the ratio of said acrylate or methacrylate to caprolactone adduct in order to vary the hardness and flexibility of the composition as desired.

17. The method of claim 16 wherein said hydroxyalkyl acrylate is hydroxyethyl acrylate.

18. The method of claim 16 wherein said caprolactone adduct is caprolactone acrylate.

19. The method of claim 16 where said isocyanate is a diisocyanate.

20. The method of claim 19 wherein said diisocyanate is isophorone diisocyanate.

21. The method of claim 16 wherein the caprolactone adduct and the hydroxyalkyl acrylate or methacrylate are employed as end capping agents for an oligomer.

22. The method of claim 16 wherein said isocyanate is in polymeric form.

23. The method of claim 22 wherein said isocyanate is a triisocyanate.

24. The method of claim 23 wherein said triisocyanate is polymeric hexamethylene diisocyanate.

25. The method of claim 22 wherein said hydroxyalkyl acrylate is hydroxyethyl acrylate.

26. The method of claim 22 wherein said caprolactone adduct is caprolactone acrylate.

27. The method of claim 22 wherein the caprolactone adduct and the hydroxyalkyl acrylate or methacrylate are employed as end capping agents for an oligomer.

28. The method of claim 16 wherein the viscosity of the composition obtained in step (b) is in the range of 6,000 to 9,700 cps/77° F.

29. The method of claim 16 which comprises partially reacting a caprolactone adduct with an isocyanate in step (a), with the isocyanate being in excess of the caprolactone adduct on an equivalent basis.

30. The method of claim 16 wherein the caprolactone adduct has the following structural formula:

$$CH_2=CHC(=O)-O-CH_2CH_2-(O-C(=O)-CH_2CH_2CH_2CH_2CH_2O)_2H.$$

* * * * *